US009375971B2

(12) United States Patent

Nugent et al.

(10) Patent No.: US 9,375,971 B2

(45) Date of Patent: Jun. 28, 2016

(54) PRINTED SECURITY FEATURE FOR SECURE BOOKLETS

(75) Inventors: Nicholas Oliver Nugent, Southampton (GB); Thomas Joseph Stebbing, Savage, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 1321 days.

(21) Appl. No.: 12/843,146

(22) Filed: Jul. 26, 2010

(65) Prior Publication Data

US 2012/0018992 A1 Jan. 26, 2012

(51) Int. Cl.

| | |
|---|---|
| ***B42D 1/00*** | (2006.01) |
| ***B42D 5/00*** | (2006.01) |
| ***B42D 15/00*** | (2006.01) |
| ***B42D 15/10*** | (2006.01) |
| ***G09C 3/00*** | (2006.01) |
| ***B42D 25/00*** | (2014.01) |

(52) U.S. Cl.

CPC ............ *B42D 25/00* (2014.10); *B42D 2035/12* (2013.01)

(58) Field of Classification Search

CPC ............................ B42D 25/00; B42D 2035/12

USPC ............ 281/3.1, 15.1; 283/72, 74, 75, 83, 86, 283/94, 98

See application file for complete search history.

(56) References Cited

U.S. PATENT DOCUMENTS 4,143,889 A * 3/1979 Scharlin ...................... 281/15.1
5,127,677 A 7/1992 Merry
5,623,347 A * 4/1997 Pizzanelli ........................ 359/2
6,783,067 B2 8/2004 Kreuter et al.
8,047,575 B2 * 11/2011 Einhorn et al. ................ 283/72
8,070,186 B2 * 12/2011 Einhorn et al. ................ 283/94
2007/0246931 A1 * 10/2007 Hansen et al. ................ 283/83

(Continued)

FOREIGN PATENT DOCUMENTS

DE 102009010800 7/2010
JP 2001-305078 10/2001

(Continued)

OTHER PUBLICATIONS

International Search Report for international application No. PCT/US2010/062219, dated Sep. 30, 2011 (4 pages).

(Continued)

*Primary Examiner* — Alexander P Taousakis
*Assistant Examiner* — Justin V Lewis
(74) *Attorney, Agent, or Firm* — Hamre, Schumann, Mueller & Larson, P.C.

(57) ABSTRACT

A security feature for use with secure booklets, especially those having a spine, for example passports, identification booklets and other types of ID3-sized documents. In one example, the security feature is printed across the spine of the booklet onto two adjacent pages. Most conventional, commercially available printers are unable to print across the spine, and therefore would be unable to reproduce the security feature. In addition, in the case of a booklet, for example a passport, that uses a stitching thread to secure the pages together, ink from the printed image bleeds into the thread. The presence or absence of ink in the thread can then act as an indicator as to whether or not the booklet is genuine or a counterfeit. Another security feature includes registration of a pre-print portion and a variable print portion that is applied during booklet personalization to form a combined image.

20 Claims, 5 Drawing Sheets

(56) References Cited

U.S. PATENT DOCUMENTS

| | | | | |
|---|---|---|---|---|
| 2007/0278422 | A1* | 12/2007 | Einhorn et al. | 250/462.1 |
| 2008/0036195 | A1* | 2/2008 | Winchcombe | 283/85 |
| 2010/0090455 | A1* | 4/2010 | Boswell et al. | 283/57 |

FOREIGN PATENT DOCUMENTS

| | | |
|---|---|---|
| JP | 2002-103843 | 4/2002 |
| WO | 2005/115767 | 12/2005 |
| WO | 2010/097226 | 9/2010 |

OTHER PUBLICATIONS

Written Opinion for international application No. PCT/US2010/062219, dated Sep. 30, 2011 (6 pages).

Extended European Search Report issued in corresponding European application 10855477.5; Aug. 5, 2015; 5 pages.

* cited by examiner

PRINTED SECURITY FEATURE FOR SECURE BOOKLETS

FIELD

This disclosure relates to a security feature for secure booklets, for example passports and identification booklets and other types of ID3-sized booklets, as well as other types of booklets that may benefit from using security features.

BACKGROUND

Security features that make it difficult to counterfeit secure booklets such as ID3-sized documents, and that also make attempts to replicate the security features more readily discernible to security personnel, are desirable. One example of a prior security feature is a hologram.

Further improvements to security features for secure booklets are desirable.

SUMMARY

An improved security feature is described for use with secure booklets, especially those having a spine, for example passports, identification booklets and other types of ID3-sized documents, as well as other types of booklets that may benefit from using security features. The security feature uses the printing of designs and images that cannot easily be simulated or copied using conventional, commercially available printers including but not limited to inkjet printers. In this way, counterfeiting of the booklet is made significantly more difficult.

In one embodiment, the security feature is printed across the spine of the booklet onto two adjacent pages. Most conventional, commercially available printers are unable to print across the spine, and therefore would be unable to reproduce the security feature. In addition, in the case of a booklet, for example a passport, that uses a stitching thread to secure the pages together, ink from the printed image bleeds into the thread. The presence or absence of ink in the thread can then act as an indicator as to whether or not the booklet is genuine or a counterfeit. To print across the spine, ink jet printing can be used.

In another embodiment, the security feature can include a pre-print portion that is pre-printed onto a page of the booklet by the booklet manufacturer, and a variable print portion that is printed onto the booklet by an entity that receives the booklet from the manufacturer or by an entity that is otherwise authorized to print into the booklet. The variable print portion is printed into the booklet at a position relative to the pre-print portion such that, when the pre-print and variable print portions are appropriately registered with each other, the pre-print portion and the variable print portion together form a combined image. Conversely, mis-alignment of the pre-print and variable print images is visually discernible. Further, the pre-print portion can be formed from one type of printing, for example lithographic, silk screen or gravure printing, while the variable print portion is formed from a second type of printing, for example ink-jet, laser, ribbon or re-transfer printing. The first type of printing should be visually discernible from the second type of printing to allow security personnel to be able to determine if the two portions are printed using different types of printing, potentially indicating a valid booklet, or printed using the same type of printing, indicating a counterfeit booklet.

The concepts of printing across a spine and registration of a pre-print portion and a variable print portion can also be used together. When used together, the pre-print portion is disposed entirely on one of the two pages and does not extend across the spine, while the variable print portion is disposed on each of the two pages and extends across the spine.

The precision of this printing and tight registration it achieves would be exceptionally difficult to reproduce using individual booklet components prior to assembly. Thus the would-be counterfeiter needs to use a system that can print on a finished booklet with the same precision. Additional anti-counterfeiting security is achieved by utilizing a vision system during the personalization process. By use of a vision registration system such as a camera, scanner, etc. and a precise handling system, the variable print portion can be registered very tightly to the pre-print portion within the booklet. By careful use of designs that would highlight mis-registration between the variable print and pre-print portions, security features may be created that would be exceptionally difficult to reproduce using conventional, commercially available printers which do not typically contain vision registration systems.

The security feature may be either on a single page or across the spine of the booklet on two pages. The pre-print and variable print can be full color, using the CMYK system, monochromatic, a combination of full color and monochromatic, and/or utilize security inks, for example UV-fluorescent.

The described personalization security feature provides a number of advantages compared to a static security feature, such as hologram, that has been applied in the booklet manufacturing process and is the same on every booklet. For example, if a blank (i.e. unpersonalized) booklet such as a passport using conventional static security features is stolen, then the criminal has an advantage as he steals the accompanying passport security features also. In contrast, by using a security feature that is added in variable form during personalization of the booklet as described herein, then the criminal needs to match the security feature using engineering and technology, and not just by theft. The engineering and technology required to match the variable, personalization security feature described herein makes it much more difficult for someone to counterfeit a booklet such as a passport.

DRAWINGS

DETAILED DESCRIPTION

An improved security feature is described in detail below for use with secure booklets, especially those having a spine. Examples of booklets that can utilize the improved security feature described herein include, but are not limited to, ID3-sized documents such as passports and identification booklets, and other types of booklets that may benefit from using security features. In appropriate circumstances, for example when the printing across the spine feature discussed below is not required, certain concepts described herein, such as the registered pre-print and variable print portions, can be used on other types of secure, non-ID3-sized documents, for example plastic cards such as identification cards and credit cards.

Figure 1:
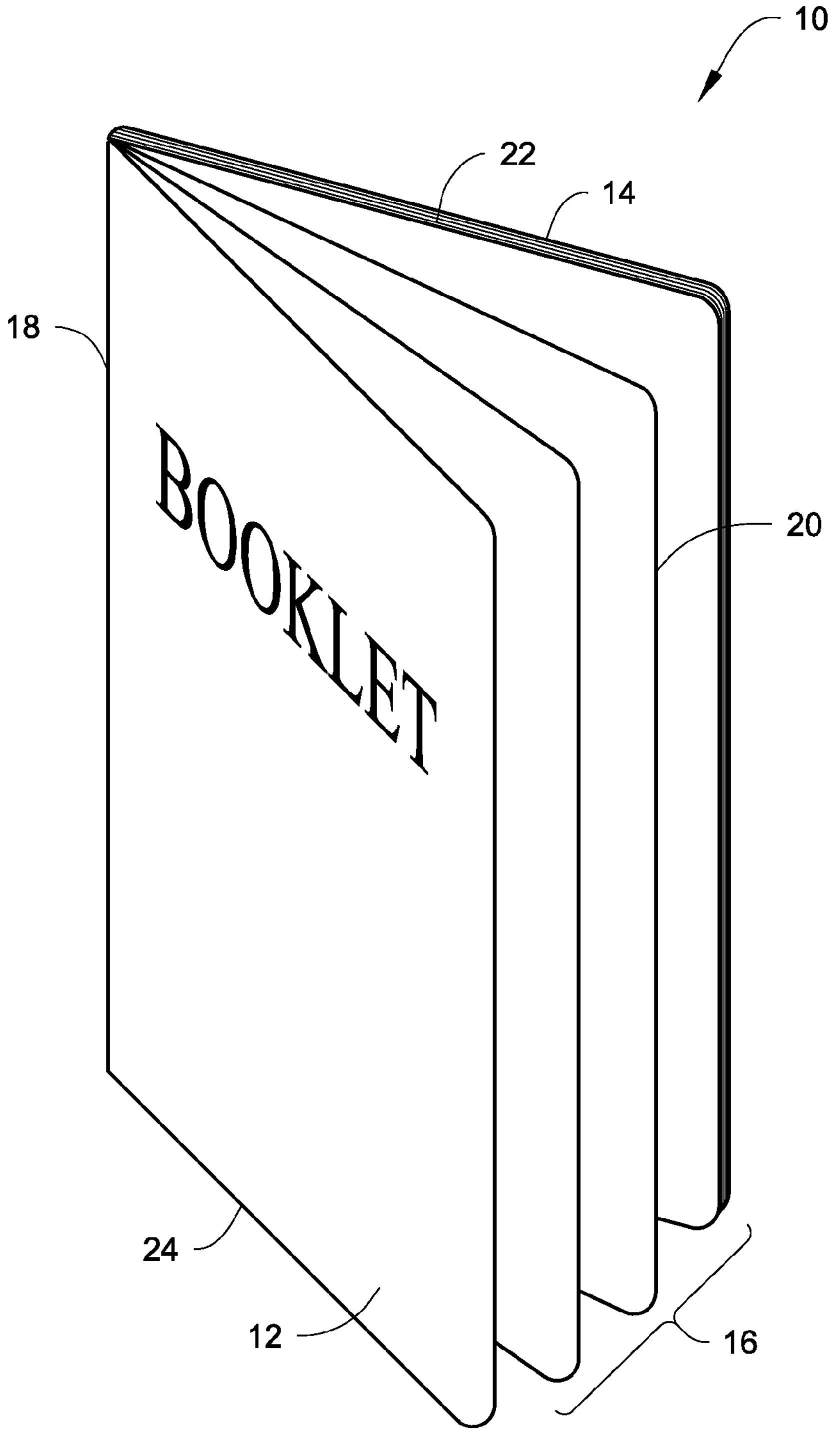
FIG. 1 illustrates a multi-page secure booklet that can employ the concepts described herein.

FIG. 1 illustrates an ID3-sized booklet 10 that can be a passport, an identification booklet or other type of ID3-sized document, that can employ one or more of the security concepts described herein. The construction of ID3-sized documents is understood to those of ordinary skill in the art. The booklet 10 includes a plurality of sheets including a front cover 12, a back cover 14, and a plurality of intermediate sheets 16 between the front cover 12 and the back cover 14. The sheets are bound, for example by sewing a stitching thread 30 (see FIG. 2) along one edge to form a spine 18. The edges 20 of the sheets opposite the spine 18 and the opposite side edges 22, 24 are unbound.

Figure 2:
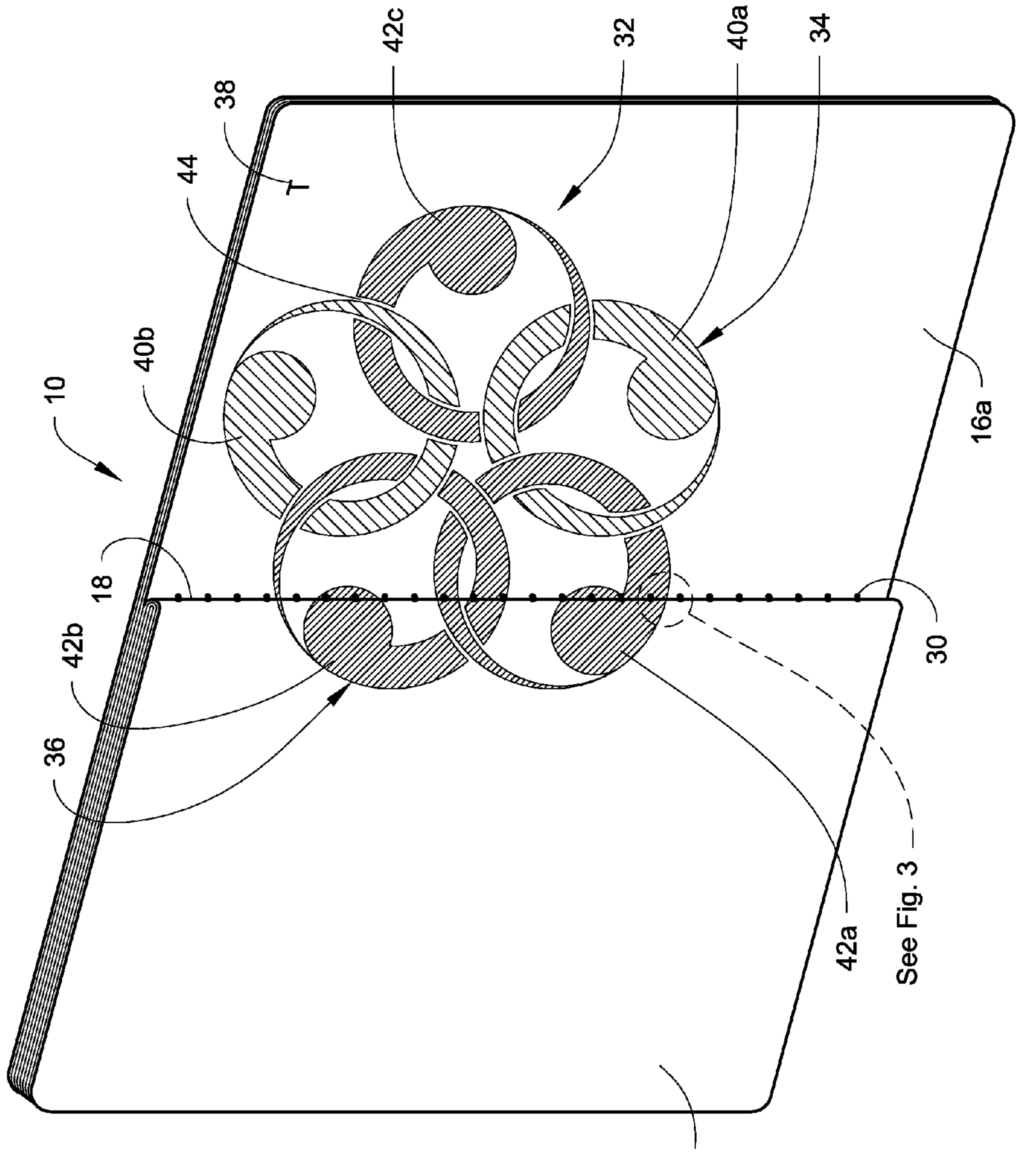
FIG. 2 illustrates the booklet of FIG. 1 opened with an embodiment of a printed security feature that employs registration of a pre-print portion and a variable print portion, and the security feature extends across the spine of the booklet.

Turning to FIG. 2, the booklet 10 is illustrated as being opened to two adjacent intermediate sheets 16*a*, 16*b*. A printed security feature 32 is illustrated as being printed on the sheets 16*a*, 16*b* and extending across the spine 18. The printed security feature 32 includes a pre-print portion 34 and a variable print portion 36 that are registered to one another to form the complete security feature 32.

The designs of the pre-print portion 34 and the variable print portion 36 are such that if they are not precisely aligned or registered with each other, the mis-alignment is visually discernible via the naked eye or under common, readily accessible magnification mechanisms useable by security personnel. A vision registration system known in the art, such as a camera, scanner, etc. and a precise handling system, also known in the art, can be used to achieve the registration between the variable print portion and the pre-print portion. Examples of suitable vision registration systems that could be used are the PB6500 vision module and the MX6000 vision module, each of which is available from DataCard Corporation of Minnetonka, Minn.

In addition, the type of printing used to form the pre-print portion 34 can be visually discernible from the type of printing used to form the variable print portion 36. Because the different types of printing are discernible to the trained eye, this acts as another means for security personnel to detect a possible counterfeit booklet.

The pre-print portion 34 is typically pre-printed by the booklet manufacturer onto a page of the booklet 10 where it is desired to locate the printed security feature 32. The pre-print portion 34 can be formed from a first type of printing, for example lithographic, silk screen or gravure printing.

The variable print portion 36 is printed onto the booklet 10 by an entity that receives the booklet from the manufacturer or by an entity that is otherwise authorized to print into the booklet. The variable print portion 36 is formed by a second type of printing for example ink-jet, laser, ribbon or re-transfer printing. A suitable registration mark 38 is provided on the sheet 16*a* that is detected by the vision registration system. The location of the pre-print portion 34 relative to the registration mark 38 is known, so that detecting the registration mark 38, one can precisely register the variable print portion 36 with the pre-print portion. The registration mark 38 can take any form as long as it can be detected by the vision registration system to know the location of the pre-print portion As indicated above, the first type of printing used for the pre-print portion 34 should be visually discernible from the second type of printing used for the variable print portion 36 to allow security personnel to be able to determine if the two portions are printed using different types of printing, potentially indicating a valid booklet, or printed using the same type of printing, indicating a counterfeit booklet.

In the embodiment illustrated in FIG. 2, the pre-print portion 34 comprises two circular-shaped objects 40*a*, 40*b* printed entirely onto the sheet 16*a*. The variable print portion 36 comprises three similar circular-shaped objects 42*a*, 42*b*, 42*c* that are intertwined with the objects 40*a*, 40*b* in the manner illustrated. The objects 42*a*, 42*b* are also intertwined with each other. The objects 42*a*, 42*b* are printed onto both sheets 16*a*, 16*b* and extend across the spine 18, while the object 42*c* is printed entirely on the sheet 16*a*. There are breaks or gaps 44 in the objects 40*a-b*, 42*a-c* where they intersect.

Figure 3:
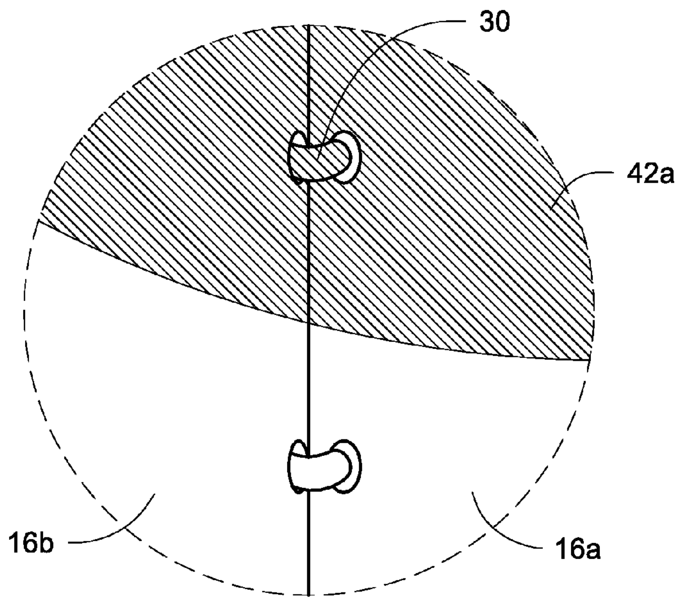
FIG. 3 is a close-up view of the spine within the area of the circle in FIG. 2 showing a stitching thread and ink that has bled into the thread.

A printer that would be suitable for printing across the spine of a booklet to form the objects 42*a*, 42*b* is disclosed in U.S. Pat. No. 6,783,067. As shown in the close-up view of FIG. 3, printing across the spine results in ink from the printing bleeding into the threads where the variable print feature crosses the spine. Therefore, the presence or absence of ink in the threads of the booklet at the location of the variable print portion across the spine provides another tool to security personnel to determine whether the booklet is valid or is a counterfeit. The bleeding of the ink into the stitching is especially pronounced when the spine is between, and the printing occurs on, the center pages of the booklet. However, if the booklet is open to and printing occurs on other pages where the stitching is much less visible, bleeding into the stitching will still likely occur to some extent.

Numerous variations of the printed security feature with a pre-print portion and a variable print portion are possible. Moreover, the printed security feature can be printed entirely onto one page so that it does not extend across the spine, or the printed security feature can extend across the spine. In addition, the concept of printing across the spine can be used in a manner where the variable print does not combine with a pre-print portion. Moreover, while the pre-print portion will typically be printed entirely onto one sheet (i.e. the pre-print portion would not typically extend across the spine 18), in circumstances where the booklet manufacturer has access to printing equipment that can print across the spine, the pre-print portion can extend across the spine.

Figure 4:
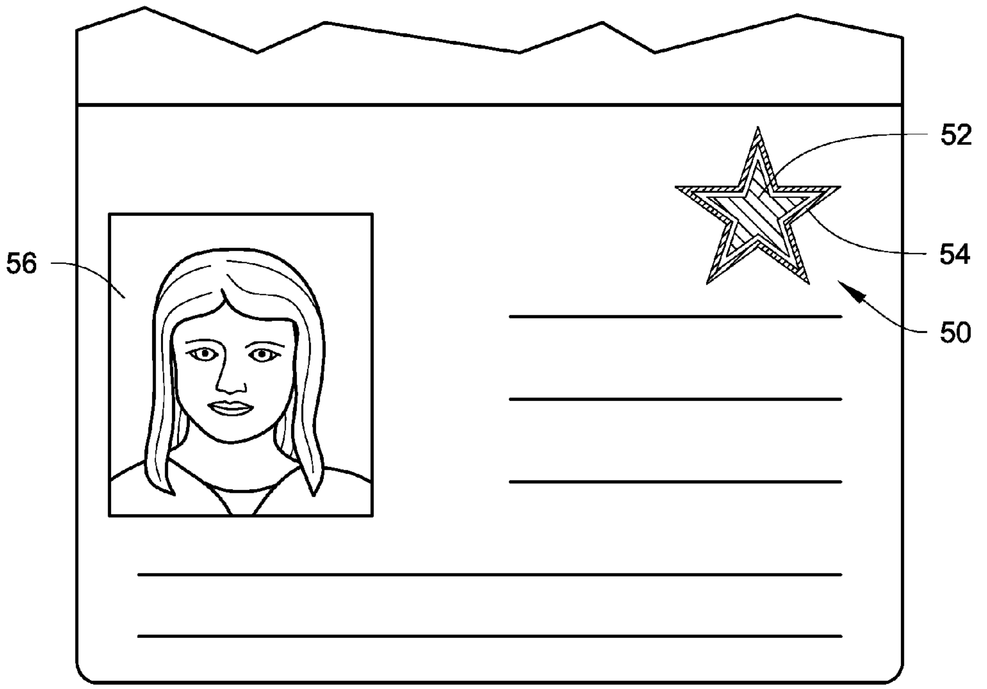
FIG. 4 is another embodiment of a printed security feature that employs registration of a pre-print portion and a variable print portion on a single page.

FIG. 4 illustrates an example of a printed security feature 50 in the shape of a star that is formed entirely on one sheet of the booklet. In this example, the feature 50 includes a pre-print portion 52 in the form of a solid star. A variable print portion 54 in the form of a hollow-star is printed in tight register around the pre-print portion 52. Mis-alignment between the pre-print portion 52 and the variable print portion 54 (for example, if any portion of the variable print portion touches the pre-print portion) would be visually discernible, thereby indicating a counterfeit booklet.

In addition to the printed security feature 50, the booklet in FIG. 4 also includes a printed photograph 56 of the booklet holder, as well as additional personal data of the booklet holder.

Figure 5:
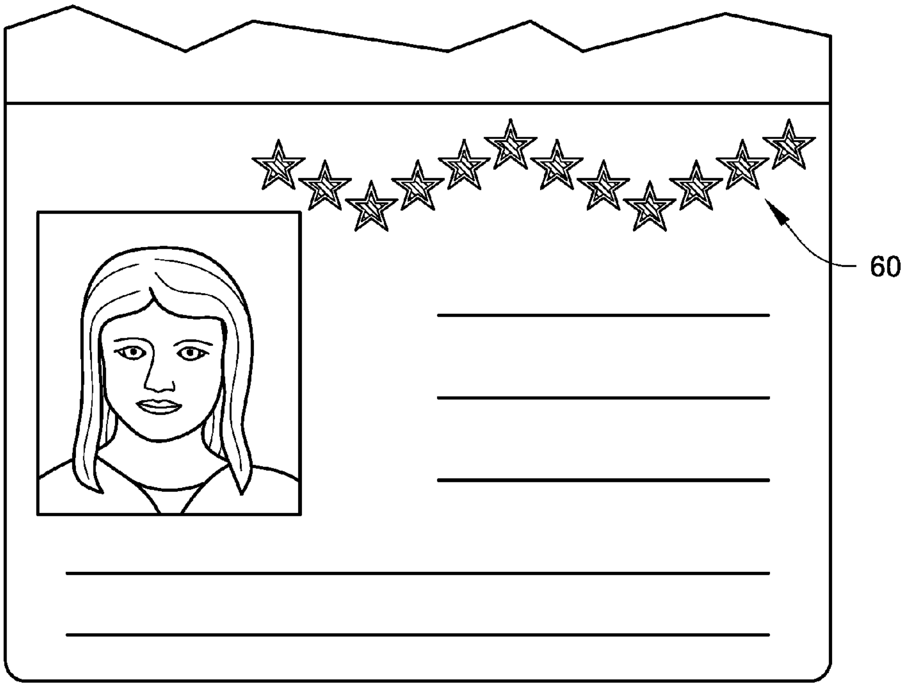
FIG. 5 is another embodiment of a printed security feature on a single page with multiple repeating printed images.

FIG. 5 illustrates another example of a printed security feature 60 formed on one sheet that uses a plurality of repeating printed security features similar to the star in FIG. 4.

Figure 6:
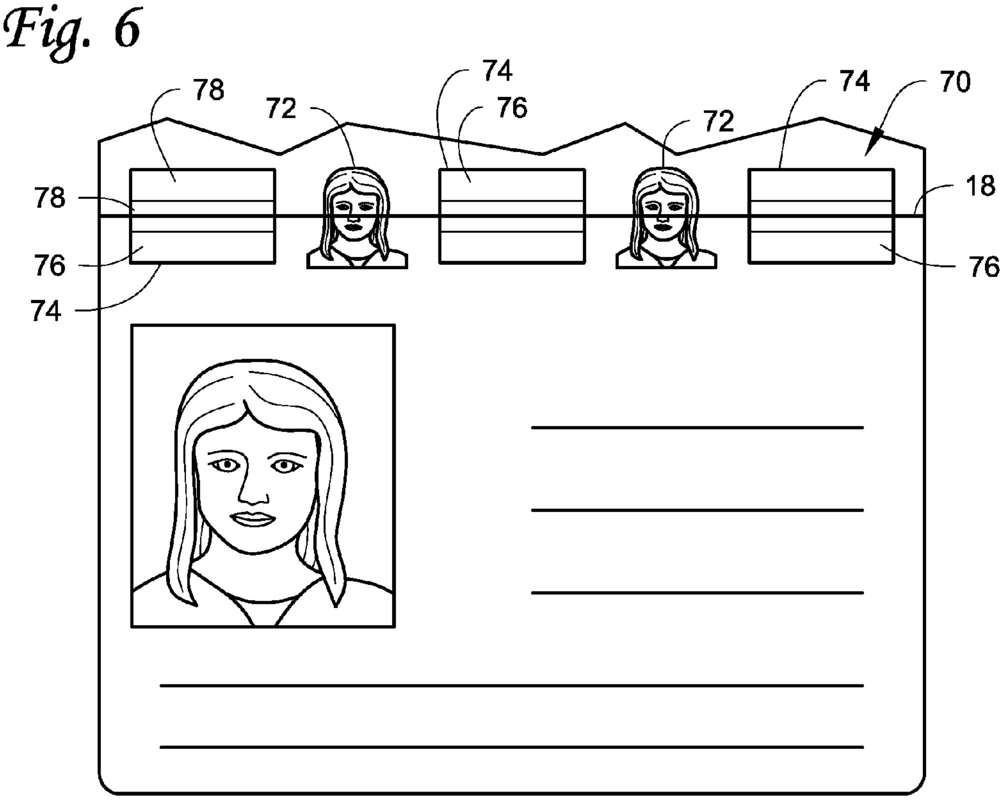
FIG. 6 is another embodiment of a printed security feature that employs both registration of a pre-print portion and a variable print portion, and printing across the spine of the booklet.

FIG. 6 illustrates an example of a printed security feature 70 that employs both registration of a pre-print portion and a variable print portion, and printing across the spine of the booklet. In FIG. 6, one or more photographs 72 of the booklet holder are printed across the spine 18 and alternate with printed images of the flag 74 of the booklet holder's country. The photographs 72 are variable print portions that do not combine with a pre-print portion. Thus, the photograph(s) printed across the spine could be used by itself as a security feature, without the printed flag images 74. The printed flag images 74 can include a pre-print portion that does not extend across the spine, and a variable print portion that extends across the spine and that combines with the pre-print portion to form the complete flag. For example, the flags 74 can have a pre-print portion 76 and two variable print portions 78. The pre-print portion and variable print portions need not be the same for each flag 74. For example, the one pre-print portion 76 can alternate from one sheet to the opposite sheet as shown by the middle flag in FIG. 6.

Figure 7:
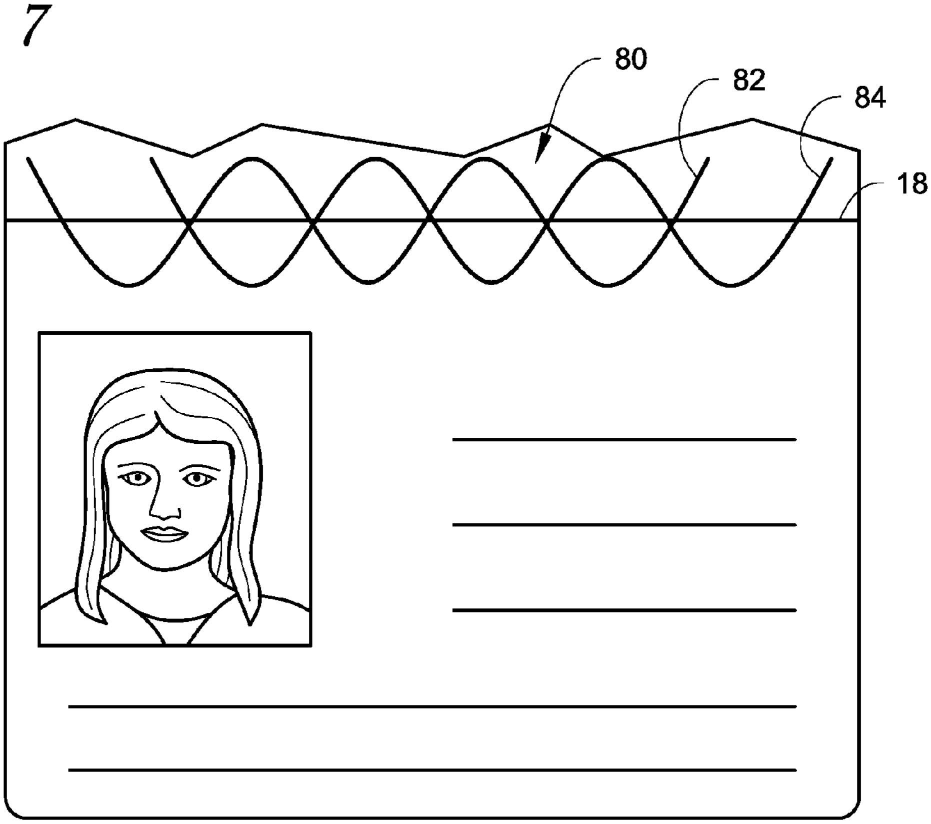
FIG. 7 illustrates another embodiment of a printed security feature that employs printing across the spine of the booklet.

FIG. 7 illustrates an example that employs a double helix-like printed security feature 80 that extends across the spine 18. In this example, both strands 82, 84 of the helix are printed across the spine and thus entirely form variable print portions without pre-print portions. However, one or both of the strands could be formed by a combination of pre-print portions and variable print portions.

The strands 82, 84 can be printed in a number of forms. For example, the strand 82 can include personal information such as the booklet holder's name, the booklet number, or an alternating sequence of these two. The strand 84 can also include personal information, such as the booklet holder's name, date of birth, or an alternating sequence of these two. Alternatively, the strands 82, 84 can be printed designs that do not contain any personal information, or can contain a combination of printed design and personal information.

Figure 8:
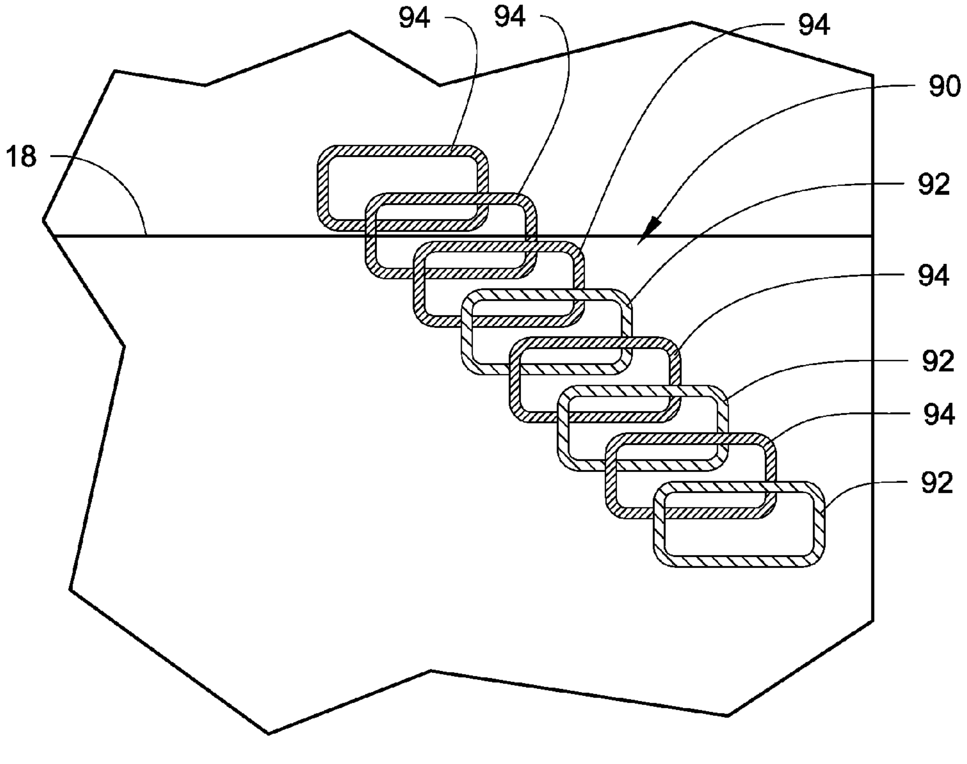
FIG. 8 illustrates another embodiment of a printed security feature that employs both registration of a pre-print portion and a variable print portion, and printing across the spine of the booklet.

FIG. 8 illustrates an example of a printed security feature 90 in the form of a chain link that extends across the spine 18. In this example, the feature 90 includes a plurality of pre-print links 92 and a plurality of variable print links 94.

In all of the embodiments discussed above, the pre-print portions and variable print portions can be formed by multi-color, using the CMYK system, monochromatic, or a combination of full color and monochromatic.

In addition, to further enhance security, security inks can be used for either or both of the pre-print or variable print portions. An example of a security ink is a UV-fluorescent added to the ink so that the printing fluoresces under appropriate light.

In an embodiment, a security feature can be formed by one or more pre-print portions with visible and/or invisible security elements (such as UV-fluorescent ink). In addition, this security feature can be in registration with one or more visible variable print portions. Further, this security feature can also be in registration with one or more invisible variable print portions. Therefore, to form this security feature, a 3-step printing process is used, where a first step comprises printing the pre-print portion, followed by two steps which comprise printing the visible variable print portion(s) and printing the invisible variable print portion(s).

The embodiments disclosed in this application are to be considered in all respects as illustrative and not limitative. The scope of the claimed invention is indicated by the appended claims rather than by the foregoing description; and all changes which come within the meaning and range of equivalency of the claims are intended to be embraced therein.

The invention claimed is:

1. A secure multi-page booklet, comprising:

a plurality of pages secured together along a spine;

a security feature printed on two of the pages and extending across the spine, the security feature including a non-transparent pre-print portion and a non-transparent variable print portion; the pre-print portion is disposed entirely on one of the two pages and does not extend across the spine; the variable print portion is disposed on each of the two pages and extends across the spine; the pre-print portion is formed by a first type of printing, and the variable print portion is formed by a second type of printing; the first type of printing is visually discernible from the second type of printing; and the pre-print portion and the variable print portion are designed to align with each other and are configured such that misalignment between the pre-print portion and the variable print portion is visually discernible.

2. The secure multi-page booklet of claim 1, wherein the booklet is an ID3-sized document.

3. The secure multi-page booklet of claim 1, wherein the spine includes stitching that secures the plurality of pages together, and ink of the variable print portion is bled into threads of the stitching.

4. The secure multi-page booklet of claim 1, wherein the first type of printing comprises lithographic printing, and the second type of printing comprises ink jet printing.

5. The secure multi-page booklet of claim 1, further comprising a registration mark on one of the two pages, and the variable print portion is printed relative to the registration mark.

6. A secure multi-page booklet, comprising:

a plurality of pages secured together via stitching along a spine;

a printed security feature extending across the spine and printed with a single ink using an ink jet printer, the printed security feature including a first portion on a first page on one side of the spine and a second portion on a second page on an opposite side of the spine, the first portion and the second portion being aligned with each other;

the printed security feature further includes a pre-print portion and a variable print portion; the pre-print portion is disposed entirely on the first page and does not extend across the spine; and the variable print portion is disposed on the first page and the second page and extends across the spine.

7. The secure multi-page booklet of claim 6, wherein the booklet is an ID3-sized document.

8. The secure multi-page booklet of claim 6, wherein the ink of the printed security feature is bled into threads of the stitching.

9. The secure multi-page booklet of claim 6, wherein the pre-print portion is formed by a first type of printing, and the variable print portion is formed by ink jet printing; and the first type of printing is visually discernible from the ink jet printing.

10. The secure multi-page booklet of claim 9, wherein the first type of printing comprises lithographic printing.

11. The secure multi-page booklet of claim 6, wherein the pre-print portion and the variable print portion are designed to align with each other to form the printed security feature, and wherein misalignment between the pre-print portion and the variable print portion is visually discernible.

12. The secure multi-page booklet of claim 6, further comprising a registration mark on the first page or the second page, and the variable print portion is printed relative to the registration mark.

13. A secure multi-page booklet, comprising:

a plurality of pages secured together;

a pre-print portion and a variable print portion, both the pre-print portion and the variable print portion are on a same single page; the pre-print portion is formed by a first type of printing and forms a first portion of a combined security feature design, and the variable print portion is formed by a second type of printing and forms a second portion of the combined security feature design; the first type of printing is visually discernible from the second type of printing; and the pre-print portion and the variable print portion are designed to align with each other to form the combined security feature design, the combined security feature design is configured such that misalignment between the pre-print portion and the variable print portion is visually discernible.

14. The secure multi-page booklet of claim 13, wherein the first type of printing comprises lithographic printing, and the second type of printing comprises ink jet printing.

15. The secure multi-page booklet of claim 13, further comprising a registration mark on the one page, and the variable print portion is printed relative to the registration mark.

16. The secure multi-page booklet of claim 13, wherein the variable print portion also extends across a spine of the booklet onto a second page.

17. The secure multi-page booklet of claim 13, wherein the pre-print portion comprises visible and invisible security elements, and the variable print portion comprises a visible security element and an invisible security element in registration with the pre-print portion.

18. The secure multi-page booklet of claim 1, wherein the variable print portion does not overlap the pre-print portion.

19. The secure multi-page booklet of claim 6, wherein the variable print portion does not overlap the pre-print portion.

20. The secure multi-page booklet of claim 13, wherein the variable print portion does not overlap the pre-print portion.

* * * * *